(12) United States Patent
DeFilippi et al.

(10) Patent No.: US 10,209,907 B2
(45) Date of Patent: Feb. 19, 2019

(54) SECURE REMOVAL OF SENSITIVE DATA

(71) Applicant: Microsoft Technology Licensing, LLC, Redmond, WA (US)

(72) Inventors: Geoffrey Naismith DeFilippi, Issaquah, WA (US); Joel D. Tipke, Seattle, WA (US); Michael Ernest Bailey, Sumner, WA (US); Charles Clayton Gardner, North Bend, WA (US); Grant D. Goodall, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 39 days.

(21) Appl. No.: 15/182,382

(22) Filed: Jun. 14, 2016

(65) Prior Publication Data
US 2017/0357456 A1    Dec. 14, 2017

(51) Int. Cl.
*G06F 11/20* (2006.01)
*G06F 3/06* (2006.01)
(Continued)

(52) U.S. Cl.
CPC ............ *G06F 3/0619* (2013.01); *G06F 3/065* (2013.01); *G06F 3/067* (2013.01); *G06F 3/0631* (2013.01);
(Continued)

(58) Field of Classification Search
CPC .................................................. G06F 11/1448
See application file for complete search history.

(56) References Cited

U.S. PATENT DOCUMENTS 6,119,151 A * 9/2000 Cantrell ............ G06F 17/30132
707/E17.01
6,772,309 B1 * 8/2004 Ohr ........................ G06F 3/0601
707/999.202
(Continued)

FOREIGN PATENT DOCUMENTS

WO    2015084354 A1    6/2015

OTHER PUBLICATIONS

Sánchez, et al., "Automatic General-Purpose Sanitization of Textual Documents", In IEEE Transactions on Information Forensics and Security, vol. 8, No. 6, Jun. 2013, pp. 853-862.
(Continued)

*Primary Examiner* — Ryan Bertram
*Assistant Examiner* — Trang K Ta
(74) *Attorney, Agent, or Firm* — Jeffrey L. Ranck; Ranck IP Law

(57) ABSTRACT

Representative embodiments disclose how to remove spilled data from an unauthorized system and/or service in a cloud service. Some embodiments allow a user to remove spilled data in a secure fashion without involving an administrator. Spilled data resides in a data structure backed by allocated storage locations. The system presents a user interface allowing a user to enter information that allows identification of the allocated storage locations. The spilled data is removed from the data structure leaving whitespace in the allocated storage locations where remnants of the spilled data can reside. The system creates a copy of the data structure, removing the whitespace. The system connects the copy of the data structure in place of the original data structure. The original allocated storage locations are then overwritten in a secure manner to remove any remnants of the spilled data.

20 Claims, 7 Drawing Sheets

(51) Int. Cl.
  *G06F 21/64*  (2013.01)
  *G06F 12/14*  (2006.01)
  *G06F 17/30*  (2006.01)
  *G06F 11/14*  (2006.01)
  *G06F 21/62*  (2013.01)

(52) U.S. Cl.
  CPC ...... *G06F 11/1448* (2013.01); *G06F 12/1466* (2013.01); *G06F 17/30117* (2013.01); *G06F 21/6218* (2013.01); *G06F 21/64* (2013.01); *G06F 2212/1052* (2013.01); *G06F 2221/2143* (2013.01)

(56) References Cited

U.S. PATENT DOCUMENTS

| | | | |
|---|---|---|---|
| 7,188,116 | B2 | 3/2007 | Cheng |
| 7,293,175 | B2 | 11/2007 | Brown et al. |
| 7,509,684 | B2 | 3/2009 | McDonald et al. |
| 7,526,620 | B1 | 4/2009 | McGovern |
| 8,719,233 | B2 | 5/2014 | Gandhi et al. |
| 8,751,439 | B2 | 6/2014 | Hakkani-Tur et al. |
| 8,898,776 | B2 | 11/2014 | Molnar et al. |
| 9,037,796 | B2 | 5/2015 | Nagpal et al. |
| 9,152,505 | B1 | 10/2015 | Brooker et al. |
| 9,524,111 | B1* | 12/2016 | Manden ............... G06F 3/0611 |
| 9,740,583 | B1* | 8/2017 | Brandwine ......... G06F 11/1448 |
| 2008/0263293 | A1 | 10/2008 | Kishi et al. |
| 2010/0199042 | A1* | 8/2010 | Bates ................ H04L 67/1095 |
| | | | 711/114 |
| 2014/0181998 | A1 | 6/2014 | Hunt et al. |
| 2014/0201526 | A1* | 7/2014 | Burgess ............... G06F 21/316 |
| | | | 713/165 |
| 2014/0324917 | A1 | 10/2014 | Haas et al. |
| 2014/0337988 | A1 | 11/2014 | Gandhi et al. |
| 2015/0153960 | A1 | 6/2015 | Koren et al. |
| 2016/0034217 | A1 | 2/2016 | Kim et al. |
| 2016/0077859 | A1* | 3/2016 | Cropper ................ G06F 9/4418 |
| | | | 718/1 |
| 2016/0378575 | A1* | 12/2016 | Hansen .................. G06Q 10/06 |
| | | | 719/318 |

OTHER PUBLICATIONS

Saxena, et al., "ScriptGard: Automatic Context-Sensitive Sanitization for Large-Scale Legacy Web Applications", In Proceedings of the 18th ACM conference on Computer and communications security, Oct. 17, 2011, pp. 601-614.

"Cyber Security Secure Data Sanitization solutions", Retrieved on: Apr. 8, 2016. Available at: http://origone.fr/services/342.

Heatherly, et al., "Automatic Sanitization of Social Network Data to Prevent Inference Attacks", In Proceedings of 20th International world wide conference, Mar. 28, 2011, pp. 55-56.

Long, et al., "The CERT® Oracle® Secure Coding Standard for Java: Input Validation and Data Sanitization (IDS)", Published on: Oct. 24, 2011 Available at: http://www.informit.com/articles/article. aspx?p=1751371&seqNum=3.

Seacord, Robert, "IDS16-J. Prevent XML Injection", Retrieved on: Apr. 8, 2016 Available at: https://www.securecoding.cert.org/confluence/display/java/IDS16-J .+Prevent+XML+Injection.

"Data erasure", Retrieved from <<https://en.wikipedia.org/w/index. php?title=Data erasure&oldid=720409420>>, May 15, 2016, 7 Pages.

"International Search Report and Written Opinion Issued in PCT Application No. PCT/US2017/036251", dated Aug. 28, 2017, 14 Pages.

* cited by examiner

SECURE REMOVAL OF SENSITIVE DATA

FIELD

This application relates generally to secure removal of sensitive data. More specifically, embodiments disclosed herein illustrate secure removal of spilled data from a cloud architecture.

BACKGROUND

As more computing power moves to the cloud, so do problems arising from the inadvertent disclosure of data. Cloud computing architectures allow users to deploy line of business and other applications in a manner that is decoupled from the hardware used to execute the applications. Thus, as more or less capacity is needed, the computer hardware can expand or contract to meet the needs of the users and applications. In addition, cloud services allow users to purchase services like email, productivity applications, accounting, CRM, and many other services. While this makes acquiring needed functionality and capacity easy, it also creates issues when data is spilled to a system that is not intended to have the data.

DETAILED DESCRIPTION

Figure 1:
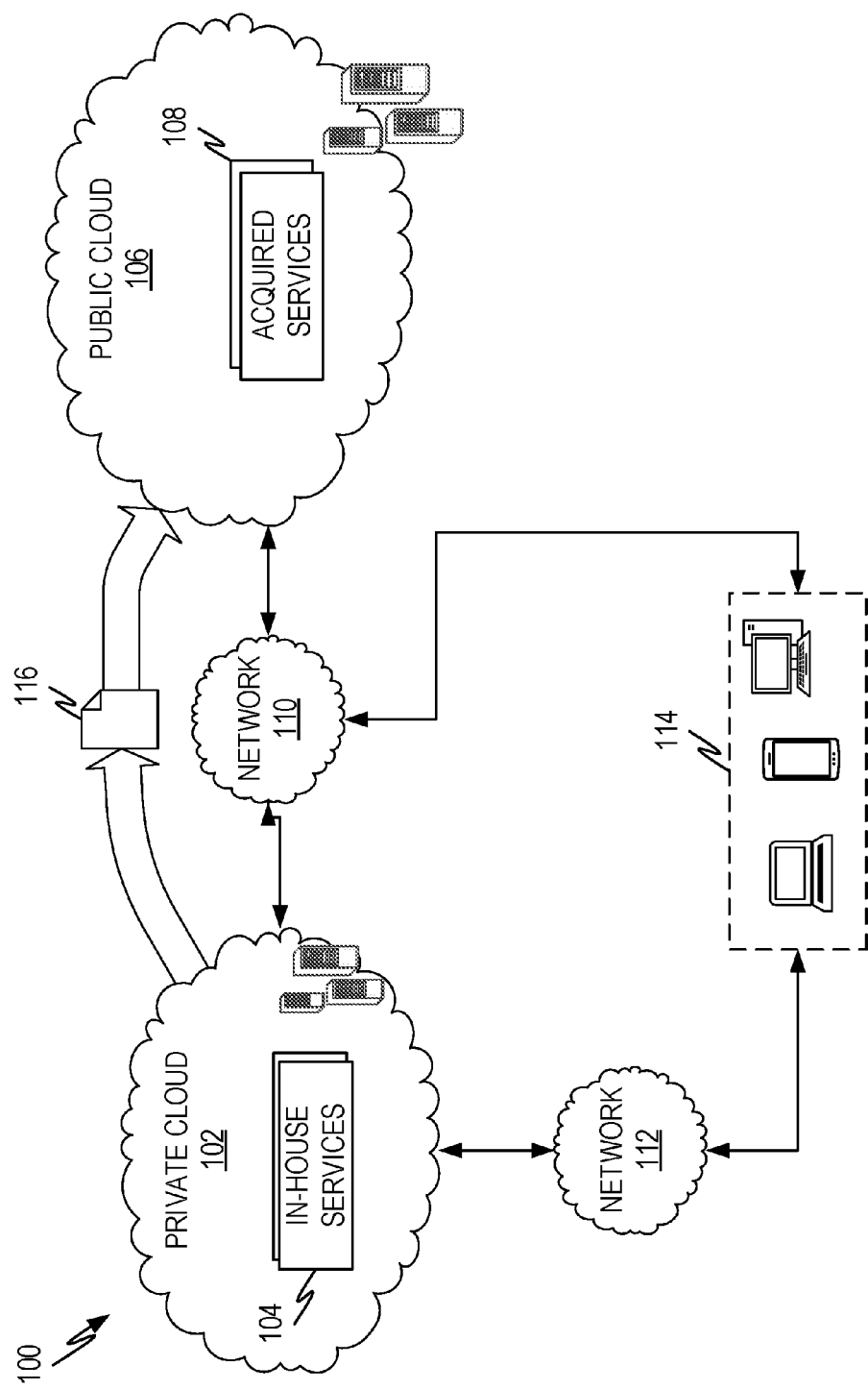
FIG. 1 illustrates an example of data being disclosed to a system not intended to have the data.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Disclosure of information to a system or service not intended to have the data can occur in many ways. In the context of this disclosure, such disclosure will be referred to as 'spillage.' Thus, data from one system 'spills' onto another, typically from an authorized system and/or service to an unauthorized system and/or service. The data thus spilled is referred to herein as spilled data. Sometimes spillage occurs because users do not understand that a certain type of information should not be used on a particular system or service. Other scenarios where spillage occurs can include situations where automation forwards or places information on a system where the data should not be placed. In the context of this disclosure, a system or service where data should not be placed will be referred to as an unauthorized system or unauthorized service.

When spillage occurs, recovery from the spillage includes removing the spilled data from the unauthorized service and/or unauthorized system. However, in today's cloud computing environments, removal of spilled data can present several technical challenges that are not easily addressed. If a user contacts a system administrator or other individual from the cloud service provider to have the spilled data removed, then an individual that perhaps should not see the spilled data must be involved in order to help remedy the system. Additionally, if more people know about the spill, then there is an increased risk of publicity around the spill. In certain situations and/or environments, a user or company may not want to publicize the fact that a spill occurred. Thus, certain embodiments disclosed herein allow for a self-help approach that does not require an administrator or other such individual to be involved. In other embodiments, the nature of what is happening when the spill is cleaned can be obscured so that someone monitoring the activities of the system will not automatically conclude that a spill is being cleaned. In this context a user will refer to any individual or entity (including an automated mechanism) that interacts with the system and methods disclosed herein.

The user interfaces, administrative tools, and other such functionality provided with cloud services typically allow a user subscribing to a cloud service to remove unwanted data, i.e., from a database, file, storage, or other locations. Typically, the user and/or cloud service interacts with some sort of data structure such as a file, database (or records therein), other other similar data structure. These data structures are backed by allocated locations in physical storage. In some cases, deleted items (files, records, email, etc.) are placed in a "trash can" or other holding area that can then be "emptied" by the user to prevent recovery of the information. These interfaces do not expose the user to the actual underlying infrastructure such as the actual locations where the data is stored, and do not securely remove the information. In many instances, when data is deleted from allocated storage locations, the allocation storage locations are simply marked as available for use in storing other information. The area where deleted data was stored is referred to herein as "whitespace" within the allocated storage locations. Someone wishing to recover the information could take steps to read the information from the allocated storage locations such as is performed by utilities that help recover 'deleted' data from hard drives and other such storage devices.

Embodiments described herein securely delete desired information through a series of operations designed to remove the ability to easily recover 'deleted' information. At a high level, these operations comprise creating a copy of the allocated storage locations that removes the whitespace within the allocated storage locations. By making a copy that removes the whitespace, the new copy is free from any locations that would have contained the spilled data (sometimes referred to herein as remnants of the spilled data).

Any entity that was previously linked to (i.e., using) the old version of the allocated storage locations can then be disconnected from the old version of the allocated storage locations and connected to the new copy. At this point, ongoing operations of the cloud service can resume with the new copy and the system can securely delete the old version of the allocated storage locations in order to reduce the likelihood of recovering of sensitive data. Numerous other operations can be performed as described in greater detail below.

In some embodiments, the system provides a user interface that allows the user to input information that will be used by the system to clean the spilled data. This information can then be used to create a workflow that performs the operations needed to clean the spilled data, including making the copy, replacing the existing data with the copy and securely deleting the copy.

Description

FIG. 1 illustrates an example 100 of data 116 being disclosed to a system not intended to have the data. In the illustrated example, a user accesses both authorized services, such as in-house services 104 provided in the private cloud 102 and non-authorized services such as acquired services 108 in the public cloud 106 through a variety of user devices 114 such as a laptop, desktop, tablet, phone or other device. The user devices 114 are connected to the private cloud 102 through a network 112 and are connected to the public cloud 106 through a network 110. The network 112 may represent, for example, a private network of the company while the network 110 may represent, for example, a public network. Although the diagram illustrates the two networks 112 and 110 as being separate networks, they can also be the same network.

Data spillage occurs if information 116 is transferred outside an authorized system or service 104 to a non-authorized system or service 108. In this disclosure secure and/or authorized are intended to convey systems where sensitive information should reside and non-secure and/or non-authorized are intended to convey systems where sensitive information should not reside. In addition, no distinction is made between a system or service is made except where such is important for an understanding of the disclosure, such as where allocated storage locations reside on a particular storage device.

In this representative example, the in-house services 104 represent authorized services while the acquired services 108 represent non-authorized service(s). However, some of the in-house services 104 may be non-authorized and some of the acquired services 108 can be authorized. Spillage occurs if information 116 moves from an authorized service/system to a non-authorized service/system.

Figure 2:
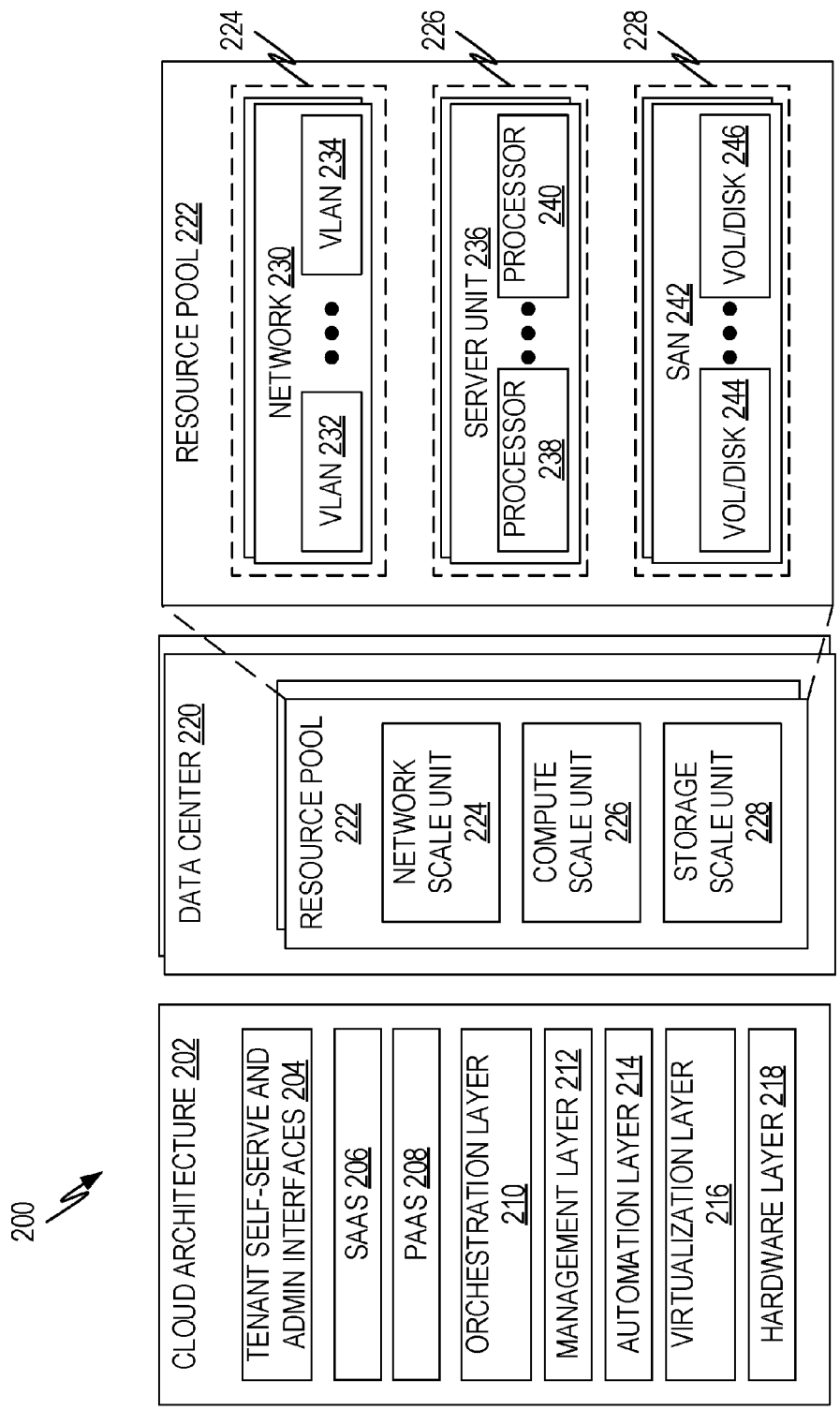
FIG. 2 illustrates an example of a cloud architecture.

FIG. 2 illustrates an example of a cloud architecture 200. This architecture represents how a cloud architecture typically appears to a user, developer and so forth and illustrates some of the technical challenges of securely removing spilled data. The architecture is generally an abstracted representation of the actual underlying cloud architecture implementation. For example, the cloud architecture 202 comprises a plurality of layers, that represent different functionality and/or services associated with the cloud architecture 202.

The hardware layer 218 includes the data center facilities and mechanical systems as well as the storage, network and computing infrastructure. Each of these elements provides enabling management interfaces to interact with higher levels of the architecture.

The virtualization layer 216 represents the virtual machines, virtual networks, containers, and so forth utilized in cloud computing architecture. This layer allows these virtual components share volumes, disks, computing resources and so forth. It is part of the capability that provides resource pooling and the elasticity associated with cloud computing.

The automation layer 214, the management layer 212 and the orchestration layer 210 build from most granular to the widest breadth in terms of IT process automation. The automation layer 214 provides the foundational technologies and services that allow an interface between higher level management systems and the virtual and physical resources.

The management layer 212 provides services that leverage the automation layer 214 technologies to perform management tasks such as checking for patch compliance, deploying patches, verifying installation and so forth. The management layer 212 provides basic process automation usually limited to one particular aspect of the server management lifecycle such as deployment, patching, monitoring, backup and so forth.

The orchestration layer 210 binds multiple products, technologies, and processes to enable end-to-end IT process automation. The orchestration layer 210 helps create and/or run IT workflows that automate complex tasks such as cluster deployment, host patching, virtual machine provisioning, and so forth.

The platform as a service (PAAS) layer 208 may include various platform type offerings such as a database, database management systems, testing tools, deployment tools, directory services and so forth. The software as a service (SAAS) layer 206 may include various service offerings such as email/instant messaging, business applications, social network, office productivity and automation, virtual desktops and so forth.

The tenant self-service and administrator interfaces layer 204 represent those services and/or interfaces that are offered to users to provide self-help type functionality. For example, this layer may provide the functionality that allows a user to delete spilled data, both in terms of the basic functionality described above (i.e., the ability to delete data, empty a trash can, etc.) and the functionality described herein that allows secure deletion of spilled data. In some embodiments, that functionality may be part of the service itself (i.e., data sharing service, email service, etc.). In some embodiments, that functionality may be part of the cloud service architecture. In yet other embodiments combinations thereof are used.

The data center 220 is a representation of the various resource pools 222 along with their constituent scale units. This data center representation illustrates the scaling and elasticity that comes with the cloud computing architecture. The resource pool 222 is comprised of server (or compute) scale units 226, network scale units 224 and storage scale units 228. A scale unit is a server, network and/or storage unit that is the smallest unit capable of deployment within the data center. The scale units allow for more capacity to be deployed or removed as the need increases or decreases.

The network scale unit 224 contains one or more networks 230 (such as network interface units, etc.) that can be deployed. The networks 230 can include, for example virtual LANs 232, 234. The compute scale unit 226 typically comprise a unit 236 that contains a plurality processing units, such as processors 238, 240. The storage scale unit 228 contains one or more storage devices such as disks, storage attached networks (SAN), network attached storage (NAS) devices, and so forth. These are collectively illustrated as SAN 242. Each SAN 242 may comprise one or more volumes, disks, and so forth 242, 246.

The architecture 200 of FIG. 2 gives a sense for the level of abstraction often presented to a user of a cloud computing architecture. If spilled data ends up in a particular set of storage locations on a particular hard drive, a user typically cannot gain access to the particular storage locations. Such access would negate at last some of the advantages of the cloud computing architecture. In order to clean spilled data, the first line of defense is for the user to use the tools provided by the server and/or system to remove the spilled data from the system. This does not render the spilled data unrecoverable by itself, but does remove simple access to the spilled data.

Figure 3:
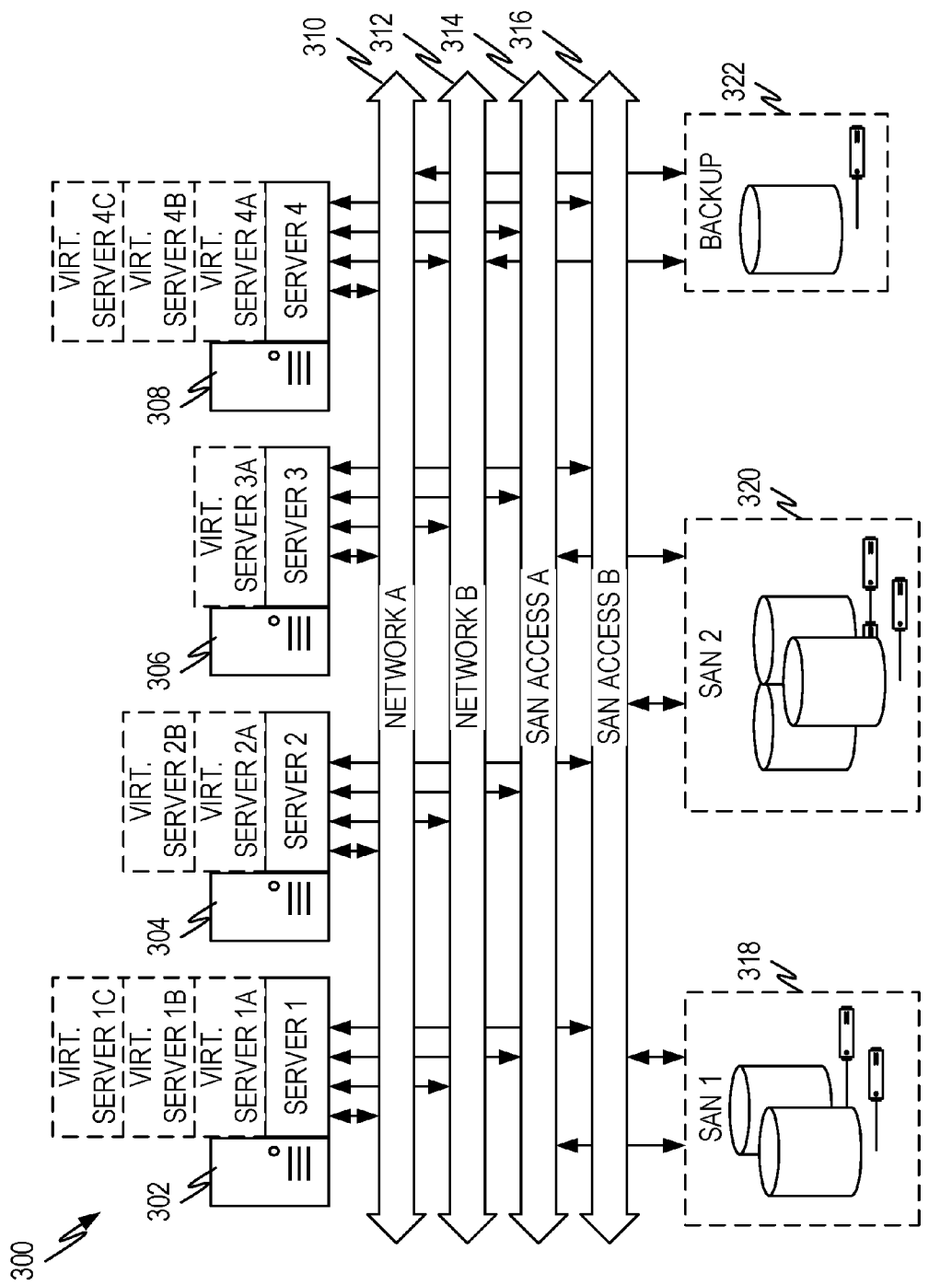
FIG. 3 illustrates another an example of a cloud architecture.

In order to reduce the likelihood of recovering spilled data, the logical architecture 200 of FIG. 2 is correlated with the actual hardware and software used in the cloud computing architecture. FIG. 3 illustrates another view of an example of a cloud architecture 300. This view is more hardware focused and illustrates the resources underlying the more logical architecture of FIG. 2. A cloud computing architecture 300 typically has a plurality of servers or other systems 302, 304, 306, 308. These servers comprise a plurality of real and/or virtual servers. Thus the server 302 comprises server 1 along with virtual servers 1A, 1B, 1C and so forth.

The servers are connected to and/or interconnected by one or more networks such as network A 310 and/or network B 312. The servers are also connected to a plurality of storage devices, such as SAN 1 (318), SAN 2 (320) and a backup 322. While the backup 322 is typically implemented via a SAN or other such storage device, it is called out separately here for purposes of explanation. SANs are typically connected to the servers through a network such as SAN access A 314 and/or SAN access B 316.

The compute scale units 226 of FIG. 2 are typically some aspect of servers 302, 304, 306 and/or 308, like processors and other hardware associated therewith. The network scale units 224 typically include, or at least utilize the illustrated networks A (310) and B (312). The storage scale units typically include some aspect of SAN 1 (318), SAN 2 (320) and/or backup 322. Thus, the logical cloud architecture of FIG. 2 can be mapped to the physical architecture of FIG. 3. As discussed below, this mapping is important for the cleaning of spilled data.

Figure 4:
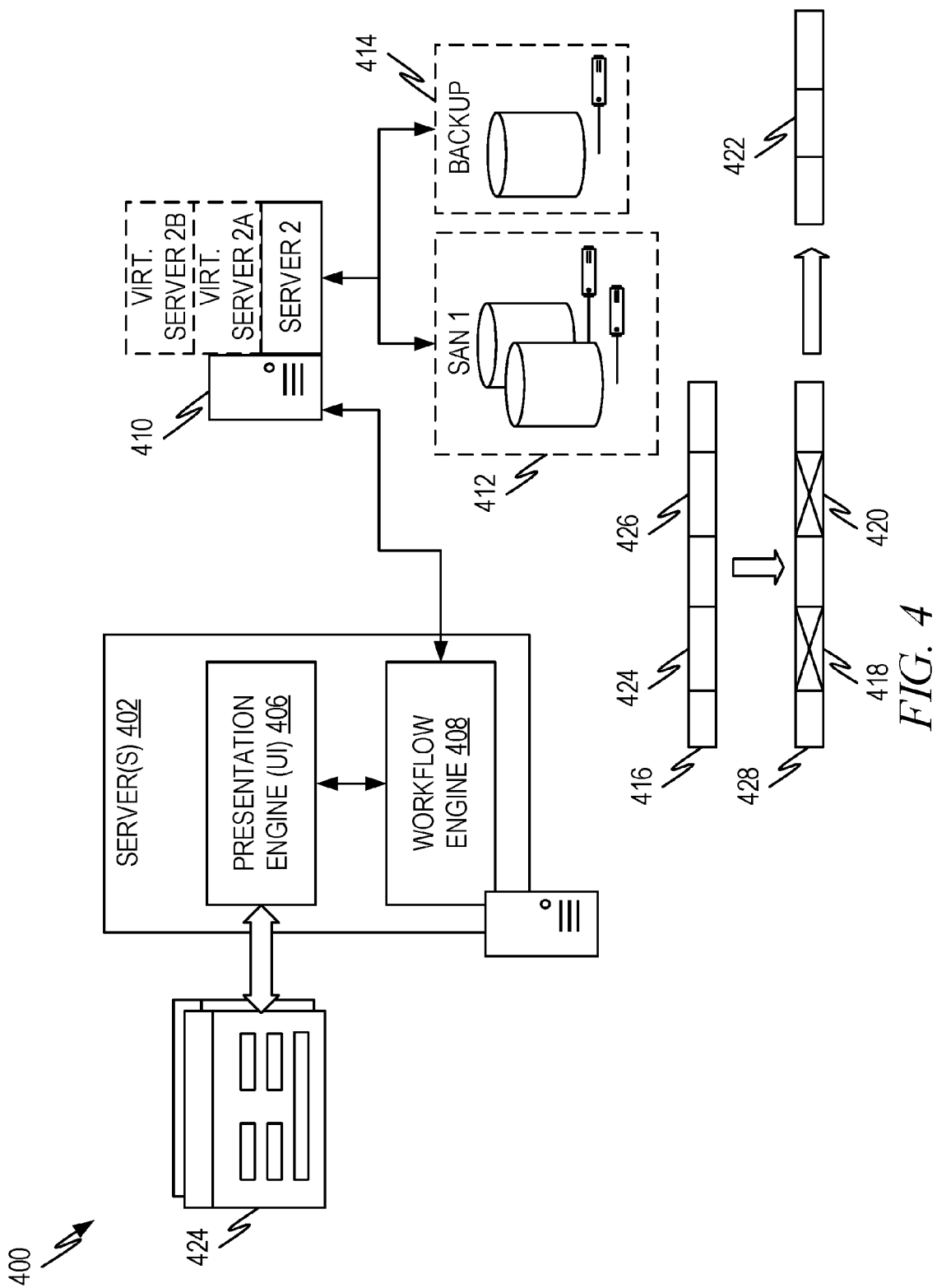
FIG. 4 illustrates an example diagram and interactions between the various aspects of a system that removes spilled data.

FIG. 4 illustrates an example diagram and interactions between the various aspects of a system 400 that removes spilled data. In this particular diagram, there are two main systems illustrated server(s) 402 represent the system that interacts with the user to gather the information to clean the spilled data. This system can be referred to as the cleaning system and/or as providing the cleaning service. The server 410 represents the cloud services and/or system(s) that have the spilled data, i.e., on storage media in the illustrated SAN 412 or some other storage device or combination of storage devices. The cloud service and/or system(s) that have the spilled data will be referred to as the target service, target system, and so forth.

There are benefits to architecting the system this way. One benefit is that the system cleaning the spill does not have the spilled data and thus is, in some sense, isolated from the data spill. Thus as the various operations are performed to clean the spilled data, the server 402 continues to operate with its full complement of resources and in some instances can more easily monitor what is happening on the systems having the spilled data. In other embodiments, the server 402 and the server 410 can be the same machine and the cleaning service and target service can reside on the same set of hardware.

As previously discussed, spilled data is typically stored in a data structure such as a file, email, database, or other data structure. These data structures are ultimately associated with a set of allocated storage locations that reside on one or more storage devices, such as a memory, disk (i.e., the SAN 412) or other device. The data structure where the spilled data is stored may be part of a service and/or system running on the hardware. For example, if the spilled data is in a file that is stored in an information sharing service (such some sort of cloud storage system, document management, personal cloud, social networking, business intelligence service, workflow management, and so forth), the spilled data resides in, or is at least associated with, the information sharing service. Thus, the information sharing service and/or users of the information sharing service are connected to the location(s) on a SAN where the information for that service, including the spilled data, is stored.

The terms "allocated storage" and/or "allocated storage locations" are intended to be interpreted broadly and capture any structure or mechanism used to store data, and can represent a logical allocated storage location, physical allocated storage location, or a combination thereof. In FIG. 4, the allocated storage locations are illustrated by the allocated storage locations 416. Within the allocated storage locations 416, spilled data resides as indicated by 424 and 426. A user can utilize the functionality provided by the service and/or system (i.e., a cloud service and/or cloud architecture management interface used to delete data and "empty" a trash can or other such location) to remove the spilled data. As discussed previously, this does not actually remove the data but can result in the locations where the spilled data is stored being marked as available for reuse by the storage system. This is illustrated in FIG. 4 where allocated storage 424 and 426 are marked as available as shown by 418 and 420 once the spilled data has been deleted. However, the underlying data has not necessarily been overwritten and can be recovered.

In some instances, deleting data places the file, database record, etc. (i.e., containing the spilled data) in a trash can or other holding area where the data can be recovered if desired. If the system behaves in this manner, the implications in how to handle the situation depends on details of how the system operates. If the system makes a copy of the data, then the copy should also be cleaned. However, in many embodiments, the system simply places a link to the file, database record, etc. in the trash can and the data continues to physically reside in its original location. In other words, no copy is created and the deleted data is simply marked as 'removed' and 'placed' in the trash can. The storage locations are not marked as available for reuse until the trash can is emptied.

Thus, the first operations a user can perform to remove spilled data is to use the system functionality to remove the spilled data and empty any trash can. This will result in the allocated storage locations appearing as illustrated in the allocated storage locations 428 with the locations holding the spilled data 418, 420 being marked as available for reuse. The methods and systems described herein then allow the user to securely remove the spilled data in a way that makes recovery unlikely.

Figure 5:
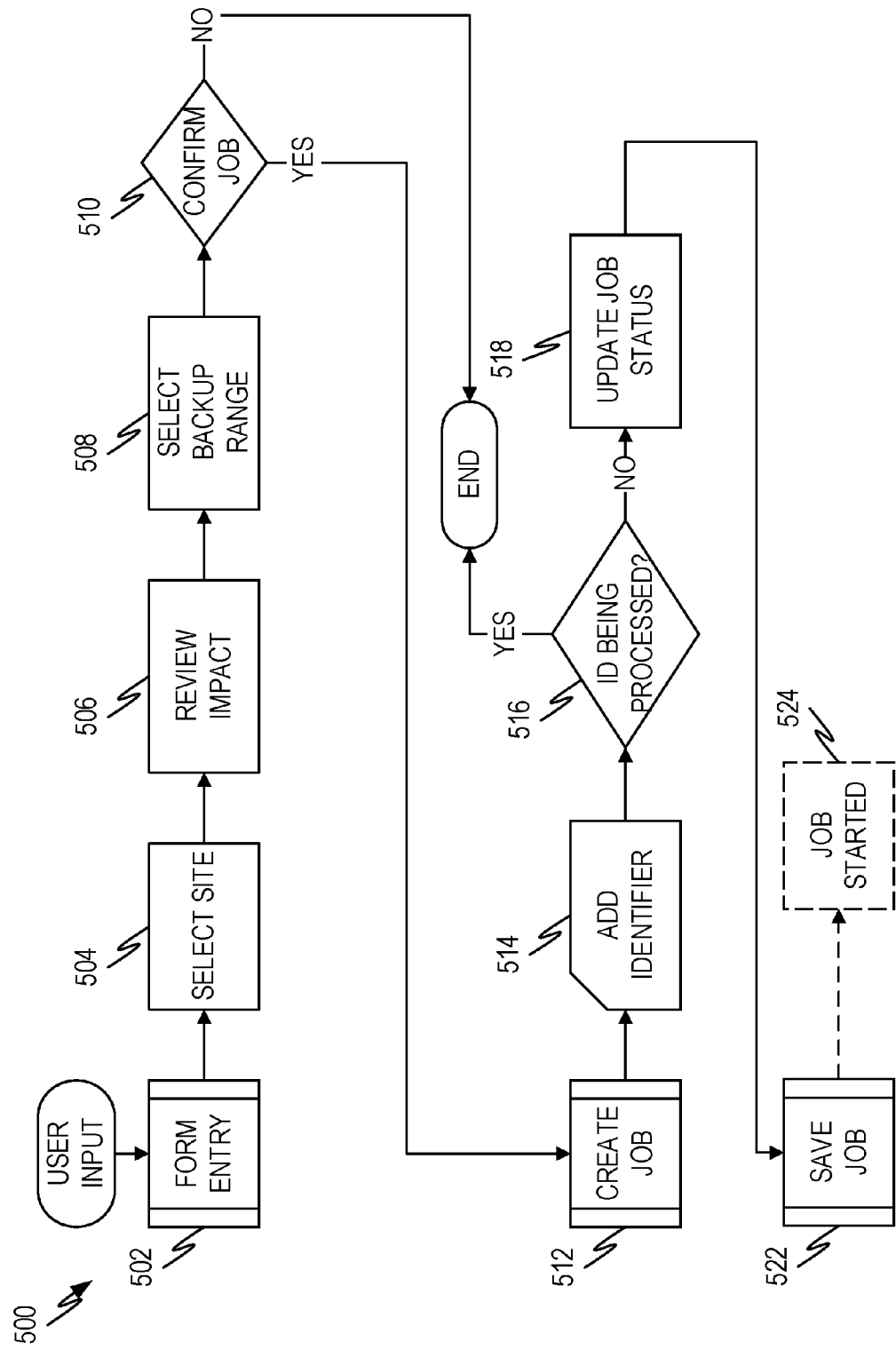
FIG. 5 illustrates an example flow diagram to create a workflow to remove spilled data.

In order to securely remove the spilled data, the system 402 presents a user interface 424 to the user to gather the information used by the system to securely remove the spilled data. The user interface can be presented, for example, using a presentation engine 406 or other interface layer components. The collected information allows the cleaning service to track down the allocated storage locations that contain/contained the spilled data. This can include, but are not limited to, information such as the service where the data is stored (i.e., an email service, data sharing service, and so forth), an account or other information identifying where the data was stored, backup sets, a date range or other identifying information to allow the system to pinpoint what backups should be removed, and so forth. This will collectively be referred to as an "identifier" that are associated with the spilled data (or a data structure where the spilled data is or was stored). Thus, such an identifier can be a service, an account, a system, data storage (i.e., file, database, and/or some other data structure), location information, backup sets, combinations thereof, and/or any other identifier or combination of identifiers that allows the system 402 to determine where the spilled data is or was stored. FIG. 5 discussed below illustrates an example flow diagram showing collection of information to allow secure removal of spilled data.

Figure 6:
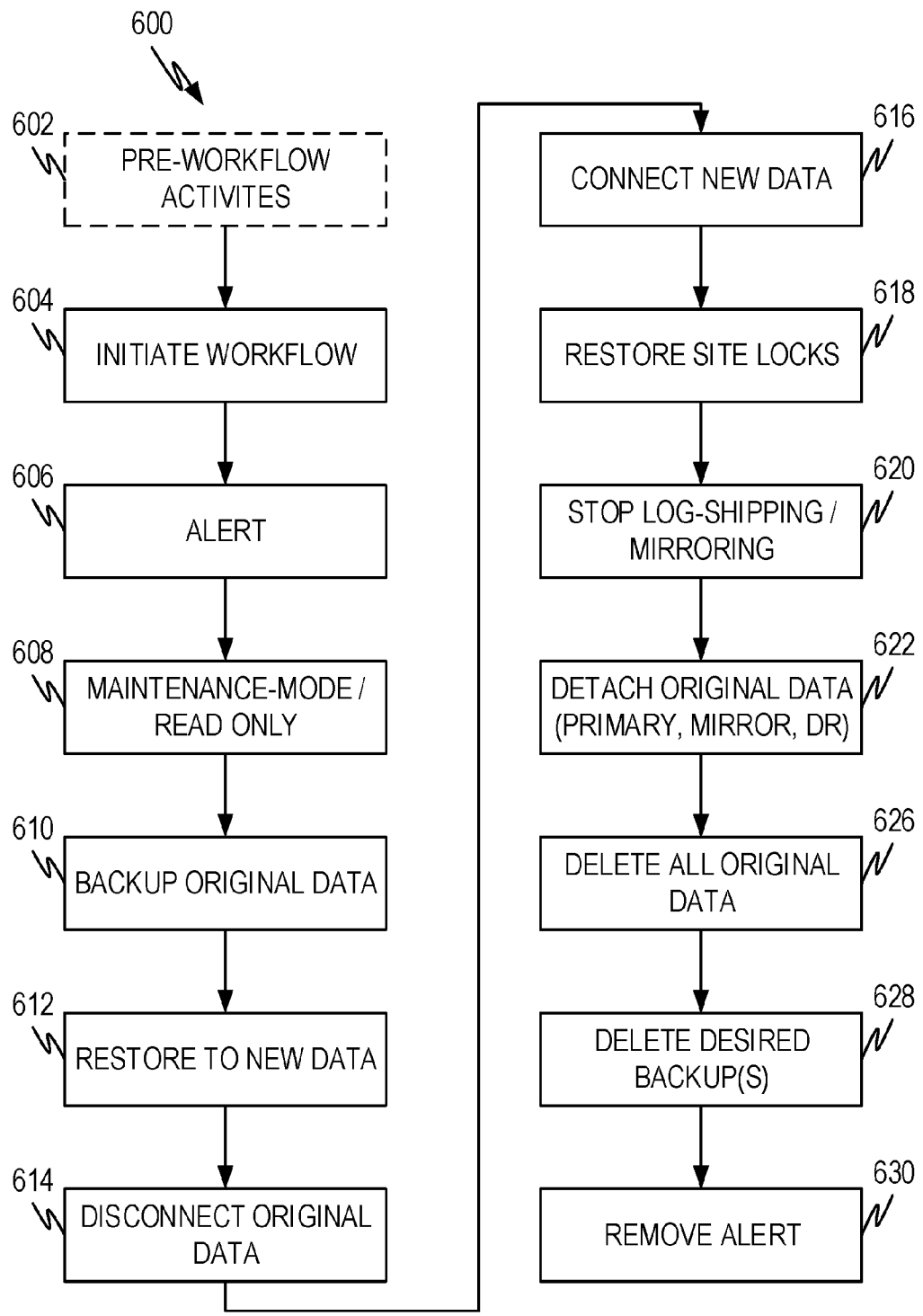
FIG. 6 illustrates an example flow diagram to remove spilled data.

Once the cleaning service has verified the collected information and received authorization from a user to proceed, the cleaning service can initiate one or more functions that result in the secure removal of the spilled data. FIGS. 5-6 show examples of the functions that result in secure removal of the spilled data. In one embodiment, a workflow engine 408 is used to perform the functions on behalf of the user. In this embodiment, the cleaning service utilizes the collected information to create workflow tasks and, once authorized by the user, places the workflow into a queue that will be executed, for example, by the workflow engine 408. Other embodiments may perform the functions using different underlying technology such as scripts, or other automation provided by the cloud service architecture (i.e., by automation layer 214, management layer 212, orchestration layer 210, and/or combinations thereof).

The information provided by the user allows the workflow engine 408 to identify which allocated storage locations contained the spilled data (i.e., 418 and 420). Thus, the information allows the system to identify the server 410 (along with the appropriate virtual servers and other resources), the SAN 412 (or other storage device(s)) and so forth where the allocated storage locations 428 along with storage locations 418 and 420 reside.

The workflow engine 408 can then place appropriate locks on the information to prevent any further changes until secure removal can take place. After the locks are in place the whitespace in the storage locations 428 can be removed. Thus, storage locations 418 and 420 are removed in this process. This can be performed in any way that results in removal of the allocated storage locations 418 and 420 and creation of a clean copy 422 that is free from any remnants of the spilled data. In one embodiment, a backup function is performed to create a clean copy 422 of the allocated storage locations 428 while removing any whitespace. The resultant copy 422 is clean of any residual spilled data (i.e., 418 and 420).

Once the backup is performed, the backup can be used to recreate a clean copy 422 of the data that has no residual spilled data. For example, if the created backup (having no whitespace) is restored, creating a new copy of the data, the new copy (i.e., 422) will be clean from any residual spilled data. This clean copy 422 can then replace the old copy 428 for use by the service, by transferring any connections from the old copy 428 to the new copy 422. The service is then connected to a clean copy of the data 422 having no residual spilled data and any residual data now resides "outside" the service and can be cleaned in a secure manner as described below.

FIG. 5 illustrates an example flow diagram 500 to create a workflow to remove spilled data. Although the flow diagram is described in connection with creating a workflow, other automation functionality can be used to perform the various functions (i.e., from an automation layer, management layer, an orchestration layer, self-help layer, etc.) as previously described. Prior to executing the operations in FIG. 5, the user can have used the system/service provided functions to delete the spilled data and 'empty' the trash if the system/service uses a trash can for deleted data. Alternatively, the user can provide the information describing the spilled data and the removal system can delete the data and empty any associated trash.

In an example embodiment, a form 502 is presented to the user to collect the information used by the system to securely remove the spilled data. This information can include, but are not limited to, information such as the service where the spilled data was stored (i.e., an email service, data sharing service, and so forth), an account or other information identifying where the spilled data was stored. If backups are also to be removed, the information can also include backup sets, a date range or other identifying information to allow the system to pinpoint what backups should be removed, and so forth.

In operation 504 the removal system identifies the site where the spilled data resided (or resides). This involves identifying the files, data structures, database, and/or so forth that holds the spilled data and the allocated storage locations associated therewith.

Operation 506 identifies the impact that removal of the spilled data will have on the service and any potential issues that may be associated with removing the spilled data. This could include, for example, an estimate of how long the service will be unavailable for use, how widespread the outage will be during removal of the spilled data, cautions about the potential for lost backup data (if backups are to be removed), or any other warnings and impacts that affect use, utilization, risks and so forth to the service. Additionally, if the hardware containing the spilled data is shared by a service, application, and so forth not associated with the spilled data, the identified impact can also include information associated with the unrelated services, etc. to be moved to different hardware so that the secure cleaning process will not affect services outside the intended service.

Operation 508 selects the backups, if any, that are to be removed based on the provided information. In some instances a user may opt for not removing backups, if the risk of spilled data being included in the backup is smaller than the risk of losing important backup data or for other reasons.

Operation 510 allows the user to confirm what is about to happen and if confirmation is received ("Yes" branch out of 510) removal proceeds as indicated below. If confirmation is not received ("No" branch out of 510), the removal process terminates.

An example may help illustrate one possible way that operations 502-510 operate. In this example, a data sharing service stores information in a plurality of databases. Spilled data leaked onto the data sharing service and was stored in a particular database. The user has removed the data from the database once the spill was detected and emptied any trash or recycle bin associated that held the deleted spilled data. In operation 502, the user specifies the date that the data spill occurred and a database name/identifier where the spilled data was stored. Optionally, the user specifies the data sharing service onto which the spilled data leaked. From this information the system identifies where the database is located (i.e., the allocated storage locations associated with the database) in operation 504. In operation 506 the system estimates that removal will result in the data sharing service being unavailable for 20 minutes starting at an estimated time. In operation 508 the cleaning service identifies backups that may contain spilled data. This information is presented to the user via a user interface along with a request to proceed in operation 510. After allowing the user to make any changes (which may result in any of operations 502-508 being re-executed), authorization is given and the system moves onto operation 512.

In operation 512, a workflow is created with the appropriate operations based on the information provided and confirmed in operations 502-510. An identifier associated with a data structure where the spilled data to be removed is added in operation 514. This identifier can be any identifier that allows the removal system to identify which database, file, data structure, and so forth contain(ed) the spilled data.

Operation 516 double checks to ensure that the database, file, data structure, and so forth associated with the identifier is not already being processed or scheduled to be processed by another workflow. In one example embodiment, the method of FIG. 5 can be performed at the request of any authorized user. Thus the self-help nature of the method can result in multiple requests being made for the same spilled data. The check in operation 516 ensures that when multiple requests are made, that only one request is executed. If the identifier (or more specifically the database, file, data structure, etc. associated with the identifier) is already being processed or scheduled to be processed, the "Yes" branch is taken out of operation 516 and the method ends. Otherwise, the "No" branch is taken and the method proceeds.

In operation 518, the workflow status is updated and the job is saved in operation 522 for execution. In some implementations this comprises saving the workflow to a work queue which will be picked up and scheduled by the workflow engine. Operation 524 indicated that the workflow is executed by the workflow engine or other automation technologies.

FIG. 6 illustrates an example flow diagram 600 to remove spilled data. In this representative flow diagram 600, the focus is on securely removing the information once a user has already used the provided functionality to delete and empty any trash associated with deleted data. These operations are illustrated in FIG. 6 by operation 602 and includes any pre-workflow activities that are performed before the workflow is created to securely remove any remnants of the spilled data. Additionally, or alternatively, the pre-workflow activities can be made part of the workflow if desired. Although the automation described in the flow diagram 600 is referred to as a workflow, as previously discussed other automation, management, and/or orchestration functionality can be used to implement removal of the spilled data.

Operation 604 represents any activities that are needed to initiate the workflow, such as the operations of the flow diagram 500 of FIG. 5. Once the workflow is initiated, operation 606 provides any alerts that are desired. For example, operation 606 can set a status indicating that the affected server(s) and/or other cloud infrastructure pieces that are the targets of the removal method are undergoing maintenance. This serves the dual purpose of informing any administrators, etc. of the cloud service architecture that the systems are undergoing a scheduled maintenance and obfuscating the actual activities being performed, namely secure removal of secure data. Thus, the logs may indicate that maintenance was performed, but will not leave a trail pointing to data spillage.

In operation 608, locks are put in place to prevent further change of the allocated storage locations in preparation for secure removal of secure data. This can be accomplished, for example, by placing the system into maintenance mode and/or placing the allocated secure locations in read-only mode. In operation 608, the current state of the locks and other access control information can be saved so that when the target service/system is re-enabled (i.e., taken out of maintenance mode, opened for read/write operation, etc.), that the locks and/or access control information can be set to the same state as before the operation 608 began. In addition, if placing the system into read-only mode, maintenance mode, or other operations performed as part of operation 608 will impact users and/or services not associated with the spilled data, those services can be moved to different systems, etc. so that their operation can continue un-impacted by the secure removal process. From the beginning of operation 608, some impact to the target service (the service from which the spilled data is to be removed) will occur. The impact depends on how wide spread the allocated storage locations are utilized within the service. If all users and the service use a single database, file, and/or other data structure where the remnants of spilled data are located, then entire operation of the service may be impacted. If only a portion of the users and/or target service utilize the database, file and/or other structure where the remnants of spilled data are located, then only partial impact to the target service may occur.

In operations 610-612 a new copy of the data is created that does not have any whitespace which may contain remnants of the spilled data. This can be accomplished, for example, by backing up the original data (operation 610) and restoring the data to a new copy 612. The backup shrinks the data and removes any whitespace and the restored copy then contains no allocated storage locations that may include spilled data. Other mechanisms can also be used to accomplish the creation of a new copy of the data that does not include spilled data nor whitespace that may contain remnants of spilled data. However, keeping track of the allocated storage locations where the spilled data resided will allow easier secure removal of the remnants of the spilled data. Otherwise, if the processes lose track of the storage locations where spilled data resided, all "available" locations can be overwritten (see below) to reduce the likelihood of recovery of the spilled data.

After operation 612, the cleaning service has a new copy of the data that does not contain any spilled data and/or remnants of the spilled data and the old copy with the remnants can be replaced with the new copy. This process is illustrated in operations 614, which disconnects the original (i.e., "old") data from the service and operation 616 which connects the new copy of the data to the service. Disconnecting can be performed, for example, by dismounting or other operations that sever the connections between the service and the original data. Connecting can be performed, for example, by mounting or other operations that establish connections between the service and the new copy. In some situations, this may be able to be accomplished in a manner that is transparent to the service and the users that are using the service. In other situations, after the new copy is mounted, the service may need to have users 'reestablish' their connection to the new copy.

Operation 618 restores the site locks to the same state that they were in before the secure removal service placed the system into maintenance/read-only mode in operation 608 if the states were preserved. If the states were not preserved, operation 618 can place the state of the site locks to a default configuration. Once the site locks are restored to their original state/default configuration, normal operation for the service can be resumed with no impact on the users. In other words, impact to the target service and the users of the target service only exists for as long as it takes to perform operations 608-618. After operation 618 has been performed, the remaining operations and secure removal of spilled data can occur without any impact on operation of the target service.

Operation 620 represents disconnecting, stopping, and/or removing any further interaction with the allocated storage locations that are about to be removed. For example, any further logging, mirroring and/or other interaction with the allocated storage location is terminated. These interactions are often provided by the cloud service infrastructure to achieve reliability or other similar goals. These interactions are typically inherent to the cloud architecture and/or are provided by the management and/or orchestration layers of the cloud architecture and are often transparent to the target service and/or users of the target service.

After any further interactions are terminated in operation 620, operation 622 detaches the original data (including primary copies, mirrored copies, and so forth) from any systems. The operation 620 is designed to fully isolate all copies of the original data so they can be securely removed from the system. The exact details may vary from implementation to implementation and from cloud architecture to cloud architecture, but all will provide mechanisms to prepare for deletion of data by removing any ongoing interaction with the data.

Once any ongoing operations and/or interactions with the data have been terminated in operation 622, all copies of the data are securely removed in operation 626, including the original copy, mirrored copies, and so forth. If deleting a file, database record, and so forth causes a copy to be made as discussed above, any copies are also removed. Furthermore, if the location of the whitespace where the remnants of the spilled data reside are somehow lost (i.e., for whatever reason the system loses track of where the spilled data was stored), then secure overwriting of all unallocated, available, unused, etc. space on the storage device can be used to ensure complete removal of any remaining remnants of spilled data.

Secure removal is typically accomplished by overwriting the allocated storage locations with some combination of all zeros, all ones, or a pattern (random or non-random) of ones and zeros. In some situations, multiple passes may be used in any combination (e.g., writing all zeros, then all ones, then a random pattern of ones and zeros). The government publishes various specifications and standards that are directed to secure data removal and the system can utilize the methods outlined therein for secure removal. For example, some systems may comply with the Department of Defense standard DoD 5220.22-M or with the more recent National Institute of Standards and Technology Special Publication number NIST SP 800-88.

Once the spilled data and/or remnants of the spilled data are securely removed in operation 626, the system can securely remove any backup copies (along with mirrored copies, etc.) that contain spilled data. Removal of the backup copies is typically accomplished in the same fashion as explained above. This can include any or all of deletion of the backup copies, emptying any trash/recycle bin, and then overwriting the whitespace locations where the backup copies resided with ones, zeros, and/or a pattern of ones and zeros as explained in the prior paragraph.

Once operation 628 is completed, secure removal of the spilled data has been achieved and any alerts can be removed in operation 630, such as removing the "maintenance" status for the system(s), and so forth.

As the various operations in the flow diagram 600 are accomplished, the system can update a status or otherwise inform the user, i.e., through a user interface, of the progress through the flow diagram. Thus, the user may be notified when the workflow starts (operation 604), when alerts are placed (operation 606), and so forth as desired to let the user know how the workflow is progressing and whether any errors are encountered. Furthermore, once the flow diagram 600 is complete (i.e., after operation 630), the user can be informed of completion of the secure removal of the spilled data long with successful completion, any errors and/or other information related to the secure removal.

Because of the nature of the workflow and operations that comprise the flow diagram 600, when errors are encountered, the user can reinitiate the removal method of the flow diagram 600 with appropriate changes in the information provided to the method. Thus, the method represents a flexible and robust way to securely remove spilled data.

Example Machine Architecture and Machine-Readable Medium

Figure 7:
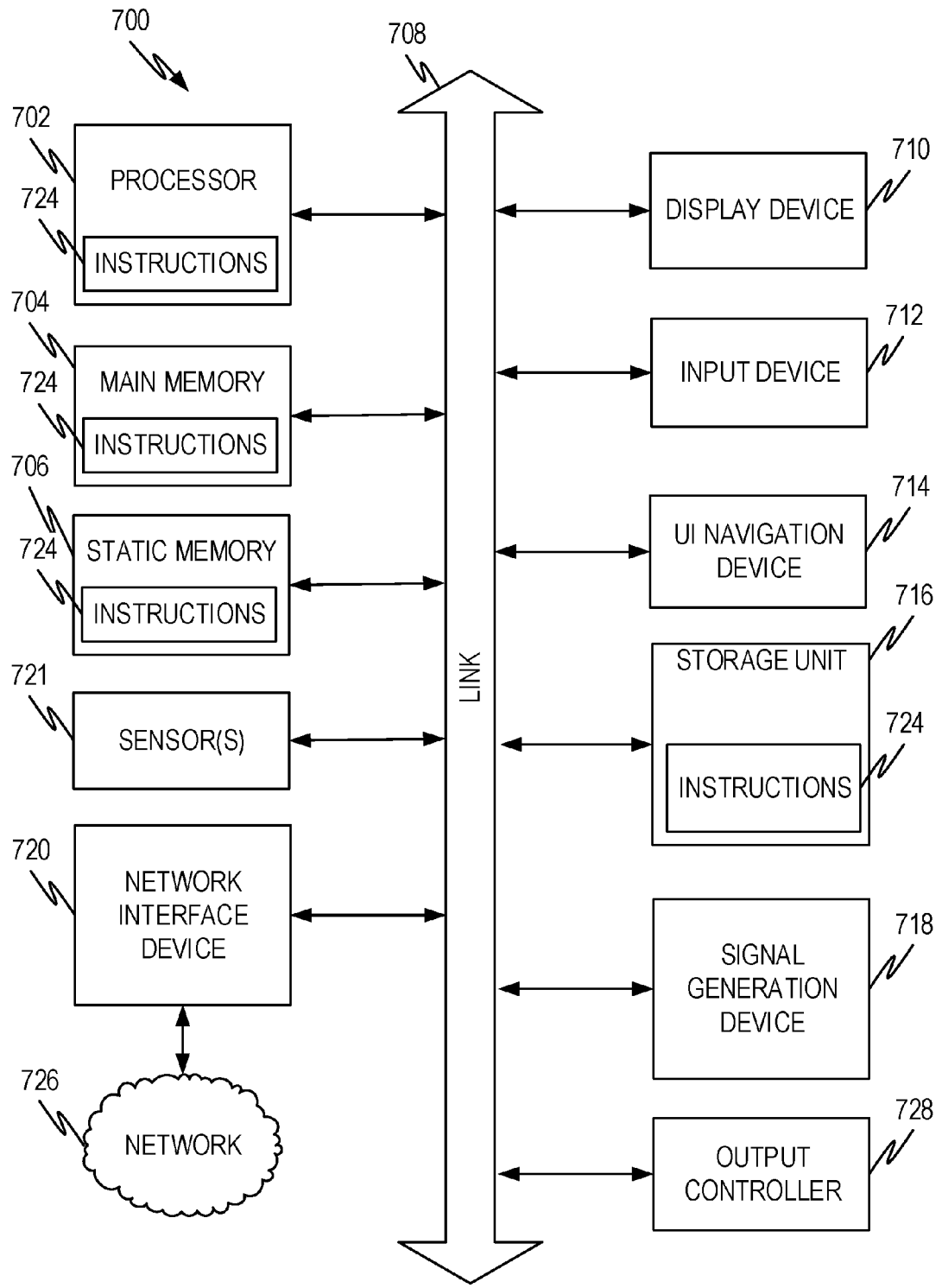
FIG. 7 illustrates a representative architecture of a machine suitable for implementing the systems, user devices, and so forth or for executing the methods disclosed herein.

FIG. 7 illustrates a representative architecture of a machine suitable for implementing the systems, user devices, and so forth or for executing the methods disclosed herein. The machine of FIG. 7 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 7 is suitable to allow those of skill in the art to determine how to implement the embodiments previously described with an appropriate combination of hardware and software.

While only a single machine is illustrated, the term "machine" shall also be taken to include any collection of machines that individually or jointly execute a set (or multiple sets) of instructions to perform any one or more of the methodologies discussed herein.

The example of the machine 700 includes at least one processor 702 (e.g., a central processing unit (CPU), a graphics processing unit (GPU), advanced processing unit (APU), or combinations thereof), one or more memories such as a main memory 704, a static memory 706, or other types of memory, which communicate with each other via link 708. Link 708 may be a bus or other type of connection channel. The machine 700 may include further optional aspects such as a graphics display unit 710 comprising any type of display. The machine 700 may also include other optional aspects such as an alphanumeric input device 712 (e.g., a keyboard, touch screen, and so forth), a user interface (UI) navigation device 714 (e.g., a mouse, trackball, touch device, and so forth), a storage unit 716 (e.g., disk drive or other storage device(s)), a signal generation device 718 (e.g., a speaker), sensor(s) 721 (e.g., global positioning sensor, accelerometer(s), microphone(s), camera(s), and so forth), output controller 728 (e.g., wired or wireless connection to connect and/or communicate with one or more other devices such as a universal serial bus (USB), near field communication (NFC), infrared (IR), serial/parallel bus, etc.), and a network interface device 720 (e.g., wired and/or wireless).

Executable Instructions and Machine-Readable Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-readable medium" and "computer-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media/computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method for removal of data comprising:
receiving an identifier from a user associated with a data structure comprising spilled data or comprising whitespace where spilled data was stored prior to its deletion;
identifying allocated storage locations in a cloud service architecture associated with the data structure;
creating a copy of the data structure, the copy comprising now spilled data or whitespace where spilled data was stored prior to its deletion;
disconnecting the data structure from any entities utilizing the data structure;
connecting the copy of data structure to the entities; and
securely removing the data structure from any physical storage devices where the allocated storage resides by overwriting the data structure with ones, zeros, or a combination thereof.

Example 2

The method of example 1, further comprising:
setting locks so the allocated storage locations cannot be changed prior to creating the copy of the data structure; and
restoring the locks to a prior condition after connecting the copy of the data structure.

Example 3

The method of example 1 further comprising:
setting an alert on at least one system associated with the data structure.

Example 4

The method of examples 1, 2 or 3 wherein creating the copy comprises creating a backup of the data structure and restoring the backup to the copy of the data structure.

Example 5

The method of examples 1, 2 or 3 further comprising:
stopping logging and mirroring of the allocated storage prior to securely removing the allocated storage.

Example 6

The method of examples 1, 2 or 3 further comprising:
detaching the allocate storage prior to securely removing the allocated storage.

Example 7

The method of examples 1, 2 or 3 further comprising:
identifying created backup sets that include the spilled data; and
securely removing the identified backup sets.

Example 8

The method of example 1, further comprising:
creating a workflow to perform the operations of example 1.

Example 9

A machine-readable medium having executable instructions encoded thereon, which, when executed by at least one processor of a machine, cause the machine to perform operations comprising:
receive information from a user comprising at least one identifier indicating where spilled data was previously stored;
identify an allocated storage based on the at least one identifier;

create a workflow to remove the allocated storage, the workflow performing operations comprising:
create a backup of the allocated storage in order to remove whitespace in the allocated storage;
restore the backup to create a new copy of the allocated storage;
disconnect the allocated storage from any entities utilizing the allocated storage;
connect the new copy to the entities; and
securely remove the allocated storage from any physical storage devices where the allocated storage resides.

Example 10

The machine-readable medium of example 9, wherein the workflow further performs operations comprising:
set at least one lock on the allocated storage so the allocated storage cannot be changed prior to creating the backup; and
restore the at least one lock on the allocated storage to a prior state after connecting the new copy.

Example 11

The machine-readable medium of example 10, wherein the workflow further performs operations comprising:
terminating logging and mirroring of the allocated storage prior to securely removing the allocated storage.

Example 12

The machine-readable medium of example 10, wherein the workflow further performs operations comprising:
identifying at least one previously created backup set;
securely removing the at least one previously created backup set.

Example 13

The machine-readable medium of examples 9, 10, 11 or 12 wherein executable instructions further cause the machine to perform operations comprising:
evaluate the impact of executing the workflow;
present the impact of the workflow to the user;
receive authorization from the user to execute the workflow;
identify whether the allocated storage is currently being processed by another workflow; and
responsive to identifying that the allocated storage is not currently being processed by another workflow, initiating execution of the workflow.

Example 14

The machine-readable medium of examples 9, 10, 11 or 12 wherein securely removing the allocated storage comprises overwriting physical storage locations on the physical devices containing the allocated storage with at least one of:
all zeros;
all ones; and
a pattern of ones and zeros.

Example 15

A computing system implementing secure removal of spilled data comprising:

a processor and executable instructions accessible on a machine-readable medium that, when executed, cause the system to perform operations comprising:
present a user interface to a user containing a form that allows the user to identify at least one of:
an identifier associated with a site where spilled data previously resided; and
a date that a data spill occurred;
receive the form from the user;
identify an allocated storage where the spilled data was previously stored based on information in the form;
create a workflow to remove allocated storage from the site, the workflow performing operations comprising:
create a backup of the allocated storage in order to remove whitespace in the allocated storage;
restore the backup to create a new copy of the allocated storage;
disconnect the allocated storage from any entities utilizing the allocated storage;
connect the new copy to the entities; and
securely remove the allocated storage from any physical storage devices where the allocated storage resides.

Example 16

A method for removal of data comprising:
receiving an identifier from a user associated with a data structure comprising spilled data or comprising whitespace where spilled data was stored prior to its deletion;
identifying allocated storage locations in a cloud service architecture associated with the data structure;
creating a copy of the data structure, the copy comprising now spilled data or whitespace where spilled data was stored prior to its deletion;
disconnecting the data structure from any entities utilizing the data structure;
connecting the copy of data structure to the entities; and
securely removing the data structure from any physical storage devices where the allocated storage resides by overwriting the data structure with ones, zeros, or a combination thereof.

Example 17

The method of example 16, further comprising:
setting locks so the allocated storage locations cannot be changed prior to creating the copy of the data structure; and
restoring the locks to a prior condition after connecting the copy of the data structure.

Example 18

The method of any preceding example further comprising:
setting an alert on at least one system associated with the data structure.

Example 19

The method of any preceding example wherein creating the copy comprises creating a backup of the data structure and restoring the backup to the copy of the data structure.

Example 20

The method of any preceding example further comprising:

stopping logging and mirroring of the allocated storage prior to securely removing the allocated storage.

Example 21

The method of any preceding example further comprising:
detaching the allocate storage prior to securely removing the allocated storage.

Example 22

The method of any preceding example further comprising:
identifying created backup sets that include the spilled data; and
securely removing the identified backup sets.

Example 23

The method of example 16, further comprising:
creating a workflow to perform the operations of example 16.

Example 24

A machine-readable medium having executable instructions encoded thereon, which, when executed by at least one processor of a machine, cause the machine to perform operations comprising:
receive information from a user comprising at least one identifier indicating where spilled data was previously stored;
identify an allocated storage based on the at least one identifier;
create a workflow to remove the allocated storage, the workflow performing operations comprising:
create a backup of the allocated storage in order to remove whitespace in the allocated storage;
restore the backup to create a new copy of the allocated storage;
disconnect the allocated storage from any entities utilizing the allocated storage (614);
connect the new copy to the entities; and
securely remove the allocated storage from any physical storage devices where the allocated storage resides.

Example 25

The machine-readable medium of example 24, wherein the workflow further performs operations comprising:
set at least one lock on the allocated storage so the allocated storage cannot be changed prior to creating the backup; and
restore the at least one lock on the allocated storage to a prior state after connecting the new copy.

Example 26

The machine-readable medium of examples 24 or 25, wherein the workflow further performs operations comprising:
terminating logging and mirroring of the allocated storage prior to securely removing the allocated storage.

Example 27

The machine-readable medium of any of examples 24-26, wherein the workflow further performs operations comprising:
identifying at least one previously created backup set;
securely removing the at least one previously created backup set.

Example 28

The machine-readable medium of any of examples 24-27 wherein executable instructions further cause the machine to perform operations comprising:
evaluate the impact of executing the workflow;
present the impact of the workflow to the user;
receive authorization from the user to execute the workflow;
identify whether the allocated storage is currently being processed by another workflow (516); and
responsive to identifying that the allocated storage is not currently being processed by another workflow, initiating execution of the workflow.

Example 29

The machine-readable medium of any of examples 24-28 wherein securely removing the allocated storage comprises overwriting physical storage locations on the physical devices containing the allocated storage with at least one of:
all zeros;
all ones; and
a pattern of ones and zeros.

Example 30

A computing system implementing secure removal of spilled data comprising:
a processor and executable instructions accessible on a machine-readable medium that, when executed, cause the system to perform operations comprising:
present a user interface to a user containing a form that allows the user to identify at least one of:
an identifier associated with a site where spilled data previously resided; and
a date that a data spill occurred;
receive the form from the user;
identify an allocated storage where the spilled data was previously stored based on information in the form;
create a workflow to remove allocated storage from the site, the workflow performing operations comprising:
create a backup of the allocated storage in order to remove whitespace in the allocated storage;
restore the backup to create a new copy of the allocated storage;
disconnect the allocated storage from any entities utilizing the allocated storage (614);
connect the new copy to the entities; and
securely remove the allocated storage from any physical storage devices where the allocated storage resides.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for removal of data in a cloud environment comprising:
   receiving an identifier from a user associated with a current data structure stored in a cloud environment, the current data structure comprising spilled data or comprising whitespace where spilled data was stored prior to its deletion;
   responsive to receiving the identifier, identifying allocated storage locations in the cloud environment associated with the current data structure;
   responsive to identifying the allocated storage locations, creating a copy of the current data structure, the copy free from any remnants of the spilled data;
   disconnecting the current data structure from any entities utilizing the current data structure, and redirecting any current connections to the copy of the current data structure to the entities; and
   responsive to disconnecting the current data structure from entities and redirecting any current connections, securely removing the current data structure from any physical storage devices where the allocated storage locations reside by overwriting the current data structure with ones, zeros, or a combination thereof.

2. The method of claim 1, further comprising:
   setting locks so the allocated storage locations cannot be changed prior to creating the copy of the current data structure; and
   restoring the locks to a prior condition after connecting the copy of the current data structure.

3. The method of claim 1 further comprising:
   setting an alert on at least one system associated with the current data structure.

4. The method of claim 1 wherein creating the copy comprises creating a backup of the current data structure and restoring the backup to the copy of the current data structure.

5. The method of claim 1, further comprising:
   stopping logging and mirroring of the allocated storage locations prior to securely removing the allocated storage locations.

6. The method of claim 1, further comprising:
   detaching the allocated storage locations prior to securely removing the allocated storage locations.

7. The method of claim 1, further comprising:
   identifying created backup sets that include the spilled data; and
   securely removing the identified backup sets.

8. The method of claim 1, further comprising:
   creating a workflow to perform the operations of claim 1.

9. A machine-readable medium having executable instructions encoded thereon, which, when executed by at least one processor of a machine, cause the machine to perform operations comprising:
   present a user interface to a user containing a form comprising a plurality of fields one of which allowing the user to enter an identifier associated with a data structure or location where spilled data previously resided;
   receive information via the form from the user comprising the identifier;
   identify allocated storage based on the identifier;
   responsive to identifying allocated storage, create a workflow to securely remove the allocated storage, the workflow performing operations comprising:
   create a backup of a current version of the allocated storage in order to remove whitespace in the allocated storage, the whitespace previously containing spilled data;
   restore the backup to create a new copy of the current version of the allocated storage;
   responsive to creating the new copy, disconnect the allocated storage from any entities utilizing the allocated storage;
   connect the new copy to the entities; and
   securely remove the allocated storage from any physical storage devices where the allocated storage resides.

10. The machine-readable medium of claim 9, wherein the workflow further performs operations comprising:
    set at least one lock on the allocated storage so the allocated storage cannot be changed prior to creating the backup; and
    restore the at least one lock on the allocated storage to a prior state after connecting the new copy.

11. The machine-readable medium of claim 10, wherein the workflow further performs operations comprising:
    terminating logging and mirroring of the allocated storage prior to securely removing the allocated storage.

12. The machine-readable medium of claim 10, wherein the workflow further performs operations comprising:
    identifying at least one previously created backup set;
    securely removing the at least one previously created backup set.

13. The machine-readable medium of claim 9, wherein the workflow further performs operations comprising setting at least one system into maintenance mode.

14. The machine-readable medium of claim 9, wherein executable instructions further cause the machine to perform operations comprising obfuscating that the workflow is removing spilled data when executing.

15. The machine-readable medium of claim 9 wherein executable instructions further cause the machine to perform operations comprising:
    prior to executing the workflow:
      evaluate an impact of executing the workflow;
      present the impact of the workflow to the user;
      receive authorization from the user to execute the workflow;
      identify whether the allocated storage is currently being processed by another workflow; and
      responsive to identifying that the allocated storage is not currently being processed by another workflow, initiating execution of the workflow.

16. The machine-readable medium of claim 9 wherein securely removing the allocated storage comprises overwriting physical storage locations on physical devices containing the allocated storage with at least one of:
    all zeros;
    all ones; and
    a pattern of ones and zeros.

17. A computing system implementing secure removal of spilled data comprising:
    a processor and executable instructions accessible on a machine-readable medium that, when executed, cause the system to perform operations comprising:
      present a user interface to a user containing a form that allows the user to identify at least one of:
        an identifier associated with a site where spilled data previously resided; and
        a date that a data spill occurred;

receive the identifier and/or date from the user;

identify an allocated storage in a cloud service architecture where the spilled data was previously stored based on the received identifier and date;

create a workflow executed in the cloud service architecture to remove allocated storage from the site, the workflow performing operations comprising:

create a backup of the allocated storage in order to remove whitespace that previously contained the spilled data in the allocated storage;

restore the backup to create a new copy of the allocated storage;

disconnect the allocated storage from any entities utilizing the allocated storage;

connect the new copy to the entities; and securely remove the allocated storage from any physical storage devices where the allocated storage resides.

18. The computing system of claim 17, wherein prior to executing the workflow the computing system performs operations further comprising:

assess impact of removal of the spilled data;

receive authorization from the user to execute the workflow;

identify whether the allocated storage is currently being processed by another workflow; and responsive to identifying that the allocated storage is not currently being processed by another workflow, initiating execution of the workflow.

19. The computing system of claim 18 wherein the operations performed by the workflow further comprise:

set at least one lock on the allocated storage so the allocated storage cannot be changed prior to creating the backup; and restore the at least one lock on the allocated storage to a prior state after connecting the new copy; and terminating logging and mirroring of the allocated storage prior to securely removing the allocated storage.

20. The computing system of claim 17 wherein the operations performed by the workflow further comprise:

identifying at least one previously created backup set that may contain the spilled data;

securely removing the at least one previously created backup set.

* * * * *